United States Patent
Brash et al.

(10) Patent No.: US 6,734,980 B1
(45) Date of Patent: May 11, 2004

(54) BODY SCANNING EQUIPMENT

(75) Inventors: Robert Alan D. Brash, Fishers Pond (GB); Timothy Tanner, Camberley (GB)

(73) Assignee: Wicks and Wilson Limited (GB)

( * ) Notice: Subject to any disclaimer, the term of this patent is extended or adjusted under 35 U.S.C. 154(b) by 0 days.

(21) Appl. No.: 09/857,534

(22) PCT Filed: Nov. 16, 1999

(86) PCT No.: PCT/GB99/03821

§ 371 (c)(1),
(2), (4) Date: Sep. 10, 2001

(87) PCT Pub. No.: WO00/36370

PCT Pub. Date: Jun. 22, 2000

(30) Foreign Application Priority Data

Dec. 11, 1998 (GB) ................................................ 9827384

(51) Int. Cl.$^7$ ............................................... G03B 11/24
(52) U.S. Cl. .......................... 356/601; 356/602; 356/608
(58) Field of Search ............................ 356/2, 601, 602, 356/608, 611

(56) References Cited

U.S. PATENT DOCUMENTS

| | | | | |
|---|---|---|---|---|
| 3,383,770 A | * | 5/1968 | Xenakis ........................ | 33/2 R |
| 4,982,438 A | * | 1/1991 | Usami et al. ................ | 382/154 |
| 5,073,782 A | * | 12/1991 | Huguenin et al. ........... | 342/179 |
| 5,850,290 A | * | 12/1998 | Horiguchi et al. ........... | 356/602 |
| 5,956,525 A | * | 9/1999 | Minsky ........................ | 396/3 |
| 6,028,672 A | * | 2/2000 | Geng ........................... | 356/602 |

FOREIGN PATENT DOCUMENTS

| | | |
|---|---|---|
| EP | 0113691 | 1/1984 |
| EP | 0305107 | 3/1989 |
| EP | 0919784 | 6/1999 |
| GB | 2264601 | 9/1993 |
| GB | 2264602 | 9/1993 |
| GB | 2195178 | 3/1998 |
| JP | 070313492 | 12/1995 |
| WO | 8304303 | 12/1983 |
| WO | 9208949 | 5/1992 |

OTHER PUBLICATIONS

English Abstract of JP 7313492 dated Dec. 5, 1995.
English Abstract of WO 92/08949 dated May 29, 1992.

\* cited by examiner

*Primary Examiner*—Rodney Fuller
(74) *Attorney, Agent, or Firm*—Wildman, Harrold, Allen & Dixon LLP

(57) ABSTRACT

A body scanning equipment includes at least two sets of apparatus located at a front and a read respectively of a body (2) to be scanned, and each set of apparatus has a scanning device (4), mirrors (5), (6) spaced on opposing sides of the scanning device for directing radiant energy to opposing sides of the body and a pivotable mirror (7) for directing radiant energy alternatively between the scanning device and the first mirror (5) and the second mirror (6); by providing one pair of sets of apparatus a complete 360° circumference of a body may be scanned. By providing a further pair of sets of apparatus at a different elevation to the first pair of sets, so a complete human body may be scanned The scanning apparatus is located in a booth (1) for installation in a store and output from the scanning apparatus is, preferably, provided to a garment material cutting apparatus (111).

15 Claims, 2 Drawing Sheets

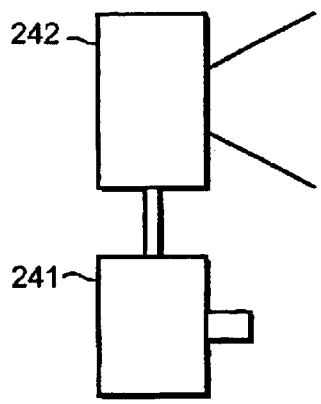
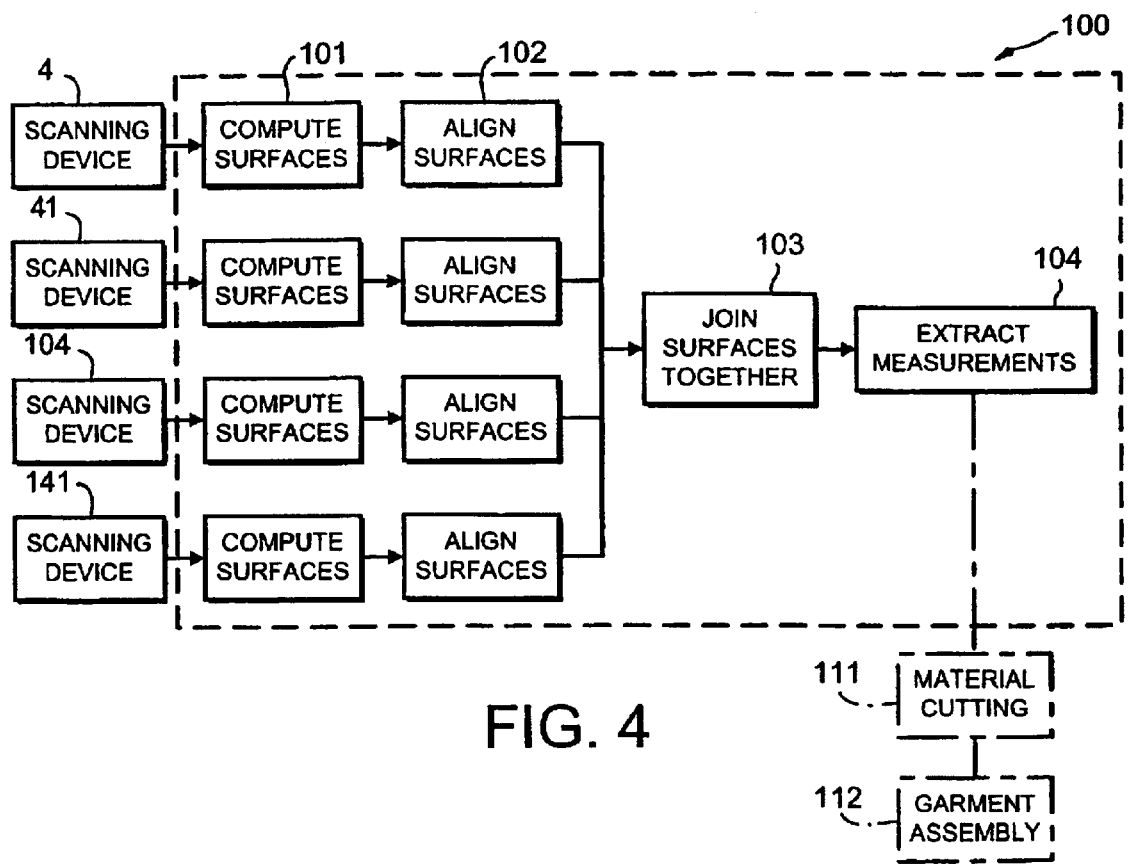

BODY SCANNING EQUIPMENT

This invention relates to body scanning equipment and, in particular, although not exclusively to, a body scanning equipment for use in the garment industry.

It is a wish in the garment industry for most, if not all, clothing to be custom made. At present, bespoke tailoring, i.e. custom made garments, are expensive to produce and most garments sold are made in different predetermined sizes and sold ready-to-wear. So as to satisfy the need for custom manufacturer garments, there is a need to define a customer's shape so that the garment can be manufactured to fit accurately. Measurement of the human body using a conventional tailor's tape measure has been shown to be prone to human error and is limited to taking a number of dimensions by time and convenience considerations. An automatic scanner which may quickly provide a large number of accurate measurements would enable custom tailoring to produce a better fit with fewer or no fitting sessions, or alternatively, to match the customer to a wider range of predefined sizes and size variants.

Body scanning apparatus is known to produce prosthesis, for example, but such equipment tends to be large in size and extremely costly.

So as to be affordable to chain and high street stores, the cost of manufacture of body scanning equipment must be kept to a minimum. Known three-dimensional scanning devices contain expensive components such as good quality cameras and electronics to control the cameras and produce a three-dimensional image. Each scanning device is limited by its position and field of view as to how much of the body surface the device can capture. Therefore, if a large part of a body surface is required to be captured, then it is necessary to use plural scanning devices spaced around the person being scanned, and the data from each scanning device is joined together to construct the whole, 360°, body surface. While such an arrangement of scanning devices overcomes the problem of capture, it demands a large number of scanning device positions and, hence, leads to a high manufacturing cost.

A further problem is one of the size of a scanning booth in which the scanning devices are lorated. Typical known scanning devices work best at ranges of about 2 metres from the surface to be scanned. Although, in theory, closer ranges are possible if the capture field of view of the scanning device is reduced, or if very wide optics are used on the scanning device. However, a smaller field of view leads to the requirement of additional scanning devices with consequential greater cost, and wide angle optics give greater distortion and, therefore, lower accuracy, as well as being costly.

The present invention seeks to provide a body scanning equipment which substantially mitigates the foregoing disadvantages.

According to a broadest aspect of this invention there is provided a body scanning equipment including one set of apparatus locate to scan a portion of a body, said set of apparatus comprising scanning means, reflector means associated with said scanning means, said reflector means including first and second reflectors spaced on opposing sides of said scanning means for directing radiant energy from opposing sides of said body, and switchable reflector means for directing radiant energy alternately between said scanning means and said first and second reflectors whereby substantially a 180° scan of said body may be made.

Such a set of apparatus may be used, for example, in a medical environment where it is desired to can a face of a person.

Where a prosthesis is required to be made or body scanning equipment for use in the garment industry, for example, then it is preferable that two sets of apparatus be provided.

Accordingly in a feature of this invention there is provided a body scanning equipment including two sets of apparatus located to scan opposing front and rear portions of a body to be scanned and each set of apparatus comprising scanning means, reflector means associated with each scanning means, each said reflector means including first and second reflectors spaced on opposing sides of said scanning means for directing radiant energy from opposing sides of said body, and switchable reflector means for directing radiant energy alternately between said scanning means and said first and second reflectors, whereby a complete 360° scan of said body may be made.

The scanning means may comprising a camera having a viewing axis and an illumination means having an illumination axis which is offset from said camera viewing axis.

Preferably, two pairs of sets of apparatus are provided, each pair being located in a different elevational position with respect to s aid body so that each pair is able to scan a whole portion of a body and the elevational location of the pairs being arranged such that a complete body may be scanned.

Conveniently, said first and second reflectors and said switchable reflector means are each formed by a respective mirror.

Advantageously, said sets of apparatus are mounted in a booth, typically approximately 2 metres square and about 2.4 metres high.

Preferably, each scanning means provides an output signal to processor means including means for computing surface data from images received from each opposing side of said body, means for producing aligned data from said surface data, means for producing a signal from said aligned data indicative of the surfaces of said body joined together through 360°, and means for calculating surface measurements derived from said means for producing.

Advantageously, said means for calculating is connected to a numerically controlled garment cutting machine which may in turn be connected to on automated garment assembly apparatus.

The invention will now be described, by way of example, with reference to the accompanying drawings in which:

FIG. 3 shows, in schematic form, a scanning device used in this invention, and

FIG. 4 shows a flow diagram of the operation of the invention.

In the Figures like reference numerals denote like parts.

Figure 1:
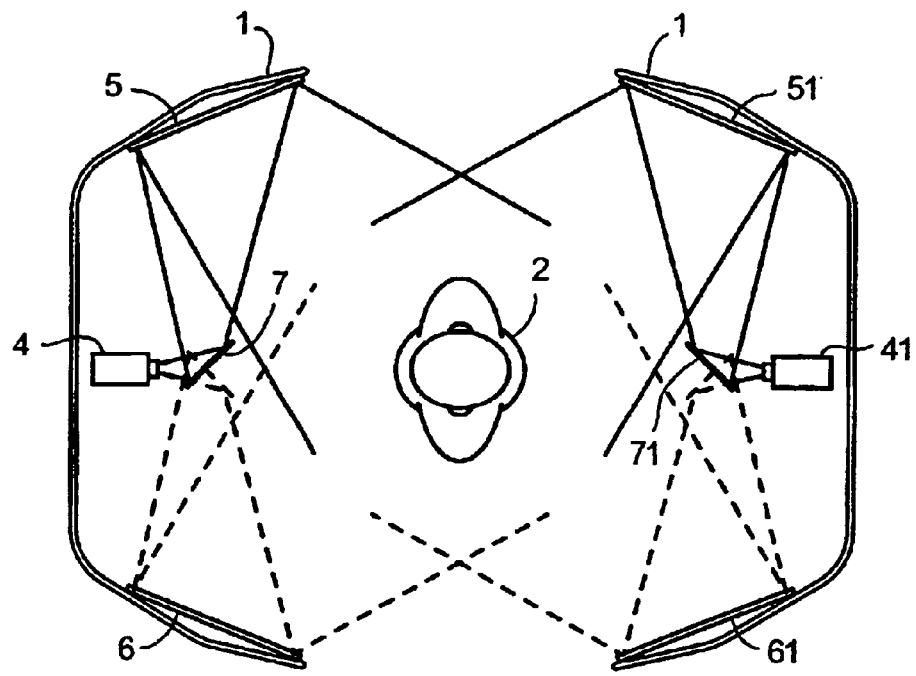
FIG. 1 shows a top plan view of an apparatus in accordance with this invention.
Figure 2:
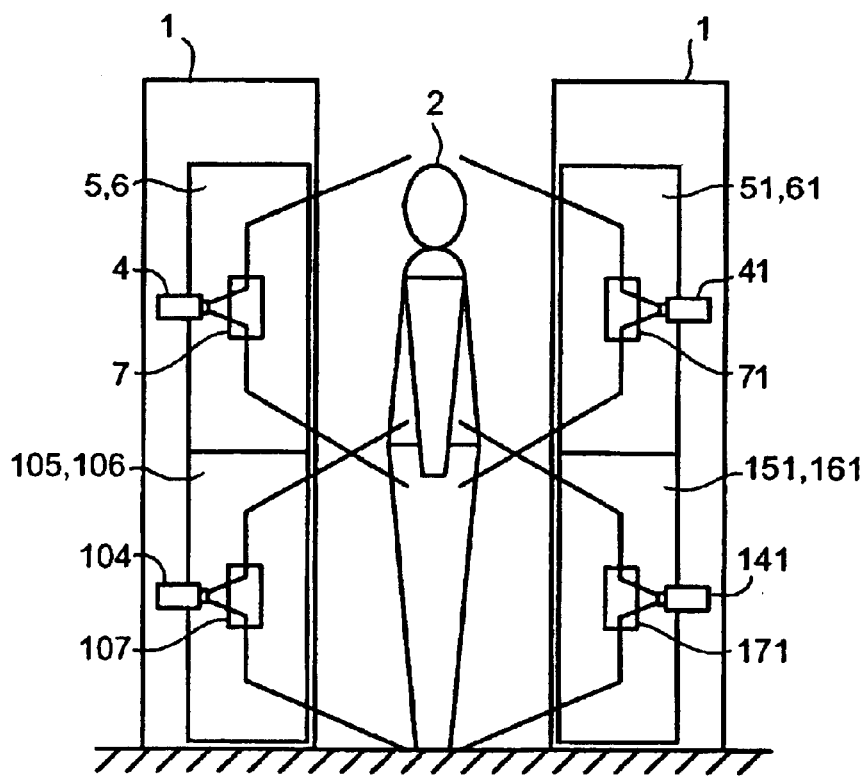
FIG. 2 shows a side view of the apparatus shown in FIG. 1.

The body scanning equipment shown in FIGS. 1 and 2 is located within a booth 1 shown in the drawings as two separate halves, although the booth may be a single member having a door. The booth typically has dimensions of approximately 2 metres square and about 2.4 metres in height. Approximately centrally located within the booth is shown a body 2 of a customer to be scanned. The body scanning apparatus includes, in the exemplary embodiment, four sets of apparatus arranged in two pairs. A first pair of sets of apparatus is arranged to scan the top portion of the body 2 and the second pair of sets of apparatus is arranged to scan the lower portion of the body 2.

Each set of a pair of apparatus is arranged to scan either a front or a rear portion of the body 2. Because each set of apparatus is the same as the other sets, the invention will be described in relation to a single set of apparatus.

Each set of apparatus has, a scanning device 4 comprising, as shown in FIG. 3, a camera 241 having a viewing axis and an illumination device, such as a lamp 242, having an illumination axis which is different from the viewing axis of the camera. The illumination axis of the lamp 242 is, preferably, at a different elevation from the viewing axis of the camera 241, although such is not essential.

A pair of inclined mirrors 5, 6 are attached on each side of the optical axis of the scanning device 4 so as to direct radiant energy to a respective side of the body 2. A pivotable mirror 7 is located in front of the scanning device 4 so as to alternately reflect radiant energy to a respective one of the mirrors 5 or 6. By pivotally skewing the mirror 7 between two positions, two effective scanner positions are derived from a single scanning device 4. The other set of apparatus on the same elevational level as the scanning device 4 and the mirrors 5, 6 and 7 is denoted by reference numerals 41, 51, 61 and 71 respectively. Scans are made sequentially with the pivotable mirror 7, 71 in each of its two positions so that the complete 360° of a body surface may be scanned with just two scanning devices. A further pair of sets of apparatus are provided elevationally below the above-mentioned pair of sets of apparatus and are denoted by reference numerals 104, 105, 106, 107 and 141, 151, 161 and 171, so that the whole 360° and whole height of the body 2 may be scanned.

The operation of the equipment will now be described with reference to FIG. 4.

The lamp 242 of each scanning device projects a pattern of light onto the surface of the body 2. The pattern of light may be obtained by a sequential series of light scans formed of narrow slits of light which are respectively projected onto different elevational locations of the body or, more usually, light is shone through a grating having plural horizontal slits therein. The body is scanned by the camera 241 and the data is processed to obtain three-dimensional surface co-ordinate data. The pattern of light that is projected comprising a series of horizontal lines is deflected by the contours of the surface of the body so that the lines appear bent when viewed at an offset angle by the camera 241. Using a sequence of such line patterns, and applying triangulation calculations to the amount by which the lines have been deflected up or down at each point on the surface, allows the surface contours to be mapped.

In the course of a scan each of the four scanning devices captures two images, one from each position of the pivotable mirror 4, 41, 104, 141. Thus, at the end of the scanning process a total of eight three-dimensional images are produced which represent eight overlapping sections of the surface of the body 2. Output from the camera of the scanning devices is applied to a processor 100. Using software, the image data from the respective positions of the mirror 7, 71, 104, 141 is computed 101 and the computed surfaces are aligned 102. The aligned surfaces are joined together at step 103 where a three-dimensional representation of the whole body surface is produced. Having obtained the three-dimensional representation of the surface of the body, automated measurements are taken from the surface data at step 104 to be used in much the same way as a tailor on the actual person.

The manner by which the processor operates is described in:

Scanning Moire Method and Automatic Measurement of 3-D Shapes Applied Optics, vol. 16, No. 8. Masanori Idesawa et al. August. 1977, and Moire Topology Applied Optics, vol.9, No. 6. H. Takasaki June 1970.

It will, thus, be appreciated that the measurements are made more quickly, non-invasively, and with greater accuracy and consistency than can be achieved manually. The measurements may be supplied as output signals to a garment material cutting machine 111, known per se, and to a garment assembly unit 112, known per se, so that custom fitted clothing is provided.

The foregoing invention overcomes the problems of cost and size and the invention provides an accurate match in geometric accuracy and colour between pairs of image sections taken with the same scanning device. The invention, by using the novel optical arrangement, reduces the amount of software data processing that is needed to match the sections of image in order to make a seamless, all round, surface.

What is claimed is:

1. A body scanning equipment including one set of apparatus located to scan a portion of a body, said set of apparatus comprising scanning means, reflector means associated with said scanning means, said reflector means including first and second reflectors spaced on opposing sides of said scanning means for directing radiant energy from opposing sides of said body, and switchable reflector means for directing radiant energy alternately between said scanning means and said first and second reflectors whereby substantially a 180° scan of said body may be made.

2. An equipment as claimed in claim 1, wherein two sets of apparatus is provided.

3. A body scanning equipment including two sets of apparatus located to scan opposing front and rear portions of a body to be scanned and each set of apparatus comprising scanning means, reflector means associated with each scanning means, each said reflector means including first and second reflectors spaced on opposing sides of said scanning means for directing radiant energy from opposing sides of said body, and switchable reflector means for directing radiant energy alternately between said scanning means and said first and second reflectors, whereby a complete 360° scan of said body may be made.

4. An equipment as claimed in claim 3, wherein scanning means comprises a camera having a viewing axis and an illumination means having an illumination axis which is offset from said camera viewing axis.

5. An equipment as claimed in claim 3, wherein two pairs of sets of apparatus are provided, each pair being located in a different elevational position with respect to said body so that each pair is able to scan a whole portion of a body and the elevational location of the pairs being arranged such that a complete body may be scanned.

6. An equipment as claimed in claim 3, wherein said first and second reflectors and said switchable reflector means are each formed by a respective mirror.

7. An equipment as claimed in claim 3, wherein said sets of apparatus are mounted in a booth, typically approximately 2 meters square and about 2.4 meters high.

8. An equipment as claimed in claim 3, wherein each scanning means provides an output signal to processor means including means for computing surface data from images received from each opposing side of said body, means for producing aligned data from said surface data, means for producing a signal from said aligned data indicative of the surfaces of said body joined together through 360°, and means for calculating surface measurements derived from said means for producing.

9. An equipment as claimed in claim 8, wherein said means for calculating is connected to a numerically controlled garment cutting machine which may in turn be connected to an automated garment assembly apparatus.

10. An equipment as claimed in claim 4, wherein two pairs of sets of apparatus are provided, each pair being located in a different elevational position with respect to said body so that each pair is able to scan a whole portion of a body and the elevational location of the pairs being arranged such that a complete body may be scanned.

11. An equipment as claimed in claim 4, wherein said first and second reflectors and said switchable reflector means are each formed by a respective mirror.

12. An equipment as claimed in claim 5, wherein said first and second reflectors and said switchable reflector means are each formed by a respective mirror.

13. An equipment as claimed in claim 4, wherein said sets of apparatus are mounted in a booth, typically approximately 2 meters square and about 2.4 meters high.

14. An equipment as claimed in claim 5, wherein said sets of apparatus are mounted in a booth, typically approximately 2 meters square and about 2.4 meters high.

15. An equipment as claimed in claim 6, wherein said sets of apparatus are mounted in a booth, typically a approximately 2 meters square and about 2.4 meters high.

* * * * *